United States Patent
Wang (10) Patent No.: US 10,150,876 B2
(45) Date of Patent: Dec. 11, 2018

(54) PAINT COATING MATERIAL FOR PRODUCING AN IMITATION CERAMIC EFFECT AND ITS APPLICATION METHOD THEREOF

(71) Applicant: Yi Wang, Shenzhen (CN)

(72) Inventor: Yi Wang, Shenzhen (CN)

( * ) Notice: Subject to any disclaimer, the term of this patent is extended or adjusted under 35 U.S.C. 154(b) by 260 days.

(21) Appl. No.: 15/169,289

(22) Filed: May 31, 2016

(65) Prior Publication Data

US 2016/0272821 A1   Sep. 22, 2016

Related U.S. Application Data

(60) Continuation-in-part of application No. 14/044,404, filed on Oct. 2, 2013, now abandoned, which is a division of application No. 13/426,248, filed on Mar. 21, 2012, now abandoned.

(30) Foreign Application Priority Data

Jan. 17, 2012   (CN) .......................... 2012 1 0013221

(51) Int. Cl.

| | |
|---|---|
| *C09D 5/28* | (2006.01) |
| *C09D 133/08* | (2006.01) |
| *B05D 5/06* | (2006.01) |
| *B05D 7/00* | (2006.01) |
| *B44F 11/06* | (2006.01) |
| *C09D 5/02* | (2006.01) |
| *C09D 133/06* | (2006.01) |
| *C09D 7/47* | (2018.01) |
| *B05D 7/02* | (2006.01) |
| *C08L 1/28* | (2006.01) |

(52) U.S. Cl.
CPC ................ *C09D 5/28* (2013.01); *B05D 5/06* (2013.01); *B05D 7/574* (2013.01); *B44F 11/06* (2013.01); *C09D 5/022* (2013.01); *C09D 5/027* (2013.01); *C09D 7/47* (2018.01); *C09D 133/066* (2013.01); *C09D 133/08* (2013.01); *B05D 7/02* (2013.01); *C08L 1/28* (2013.01); *Y10T 428/31551* (2015.04); *Y10T 428/31562* (2015.04); *Y10T 428/31576* (2015.04)

(58) Field of Classification Search
CPC .......... C09D 5/28; C09D 133/08; B05D 1/02; B05D 1/28; B05D 7/50
USPC ....................................................... 428/323
See application file for complete search history.

(56) References Cited

FOREIGN PATENT DOCUMENTS

CN    101298378    * 11/2008

OTHER PUBLICATIONS

Translation of abstract of CN 101298378, Nov. 5, 2008. (Year: 2008).*

* cited by examiner

*Primary Examiner* — Hui H Chin
(74) *Attorney, Agent, or Firm* — Tsz Lung Yeung (57) ABSTRACT

A coating material with a primer layer, a middle layer and a surface layer and its method of application which includes the steps: (1) spraying the primer layer material onto an article; (2) spraying or brushing the middle layer material with a first color until satisfactorily coated; (3) repeating step (2) with the middle layer material having a second color and allowing drying; and (4) spraying the surface layer material of PU imitation porcelain material and allow drying to obtain the article with superior imitation ceramic effect. The present invention can be applied to any plastic and poly articles with a contoured body, making a highly imitative ceramic article such as pot or vase to replacing the existing authentic ceramic articles. Since the material being used is biodegradable, therefore effectively decreasing the level of pollution and damages to the environment and hence lessening the health hazards to human.

6 Claims, 4 Drawing Sheets

PAINT COATING MATERIAL FOR PRODUCING AN IMITATION CERAMIC EFFECT AND ITS APPLICATION METHOD THEREOF

CROSS REFERENCE OF RELATED APPLICATION

This is a Continuation-In-Part application of non-provisional application Ser. No. 14/044,404, filing date Oct. 2, 2013, which is a divisional application of non-provisional patent application Ser. No. 13/426,248, filing date of Mar. 21, 2012, which claimed priority of a CHINA application number 201210013221.3, filing date Jan. 17, 2012. The contents of these specifications, including any intervening amendments thereto, are incorporated herein by reference.

BACKGROUND OF THE PRESENT INVENTION

Field of Invention

The present invention relates to paint coatings and its application method, and more particularly to a paint coating material and its spraying method which is applicable to a prefabricated article so as to produce a superior imitation ceramic effect on the prefabricated article.

Description of Related Arts

Ceramic raw materials include kaolin, clay, porcelain stone, china clay, coloring agent, blue and white porcelain material, organic soil such as lime glaze and lime-alkali glaze. Ceramic materials have excellent mechanical properties, high level of abrasion resistance and are easy to clean. Therefore, ceramic materials are widely used by people and become an important substance in people's lives and in industrial production. The superior performance of ceramic articles is originated from its unique processing method which involves milling, molding and sintering process. However, when the society develops over time and people have increased awareness of environmental protection, problems of resource consumption, energy consumption and environmental damaging effect associated with the production process of ceramic articles are increasingly important issues to us. Accordingly, a new area concerning exploitation, production and application of materials in relation to environmental protection in materials research is developed.

During the early stage of development, the major material of paint coating is vegetable oil and therefore paint coating is named as "paint". The paint coating materials, which are either the traditional paint materials made with natural raw materials, or the synthetic industrial product in modern development, belong to organic chemical polymer material which is a coating of macromolecular compound. The paint coating material being used is very difficult to be decomposed in the soil, therefore uses or disposal of the paint coating material or article which is very difficult to decompose in the soil over time will cause a very serious pollution hazards to the environment. In addition, because regular paint only has properties of anticorrosion, waterproof, chemical resistant, light resistant and temperature resistant, a truly imitation ceramic effect is not achieved.

Over the years of development, the ceramic articles has specific meanings in China. The ceramic articles are articles made in clay and the like and has a manufacturing process which includes milling, molding and sintering under very high temperature to process a specific hardness and appearance, which at least includes the particular appearance, shade, color and painting effect, as well as the color depth, the glaze streaming and glaze change effect. However, there is still no way to achieve this particular appearance, color depth, glaze streaming, glaze changing effect and hardness.

SUMMARY OF THE PRESENT INVENTION

In order to solve the above problems, an object of the present invention is to provide a paint coating and its spraying method in which the paint coating material is readily decomposable in soil and therefore is environmental friendly while the paint coating can be applied onto a variety of materials and produce a superior imitation ceramic effect. In other words, the present invention provides an environmental friendly paint coating material with superior imitation ceramic effect and its method of application.

Additional advantages and features of the invention will become apparent from the description which follows, and may be realized by means of the instrumentalities and combinations particular point out in the appended claims.

According to the present invention, the foregoing and other objects and advantages are attained by the followings:

A coating material with imitation ceramic effect comprises a primer layer, a middle layer and a surface layer, wherein the primer layer is plastic primer paint material comprising the following major primer layer ingredients by percentage weight: butyl acetate: 5-10; ethyl acetate: 5-10; thermosetting acrylic resin: 50-60; propylene glycol methyl ether acetate (PGMEA): 3-10; solvent-based wetting and dispersing agent: 1-5; anti-settling agent: 1-2; organic silica anti-foaming agent: 0.1-0.5 and a preset primer layer pigment: 10-30, wherein the middle layer is a water-based imitation porcelain coating or an oil-based imitation porcelain coating, wherein the water-based imitation porcelain coating comprises the following major water-based middle layer ingredients by percentage weight: pure water: 20-30; water-based organic silica anti-foaming agent: 0.1-0.5; water-based wetting and dispersing agent: 0.1-1; water-based mildew resistant agent: 0.1-1.5; water-based anticorrosive agent: 0.1-0.5; precipitated calcium carbonate: 3-10; ethyl cellulose: 0.1-0.5; talcum powder: 3-10; titanium dioxide rutile: 10-20; acrylic copolymer emulsion: 30-50; water-based coalescing agent: 0.5-2 and glycol: 1-5, wherein the oil-based imitation porcelain coating comprises the following major oil-based middle layer ingredients by percentage weight: butyl acetate: 5-10; ethyl acetate: 5-10; ethyl cellulose: 20-30; acrylic resin: 20-40; propylene glycol methyl ether acetate (PGMEA): 5-10; solvent-based wetting and dispersing agent: 1-5; anti-settling agent: 0.5-3; organic silica anti-foaming agent: 0.1-0.5 and a preset middle layer pigment composition: 10-20, wherein the surface layer is a polyurethane (PU) imitation porcelain surface coating comprising a major surface layer composition and a curing agent, wherein the major surface layer composition comprises the following major surface layer ingredients by weight: butyl acetate: 5-10; xylene: 4-10; acrylic polyol resin: 80-85; propylene glycol monomethyl ether acetate: 4-8; organic silica leveling agent: 0.5-2 and organic silica anti-foaming agent: 0.1-0.5, wherein the curing agent comprises the following major curing agent ingredients by weight: butyl acetate: 15-30; xylene: 15-30 and isocyanate curing agent: 40-65.

According to the preferred embodiment of the present invention, a coating material with imitation ceramic effect comprises a primer layer, a middle layer and a surface layer, wherein the primer layer is plastic primer paint material comprising the following major primer layer ingredients by percentage weight: butyl acetate: 9; ethyl acetate: 7; thermosetting acrylic resin: 55.7; propylene glycol methyl ether acetate (PGMEA): 5; solvent-based wetting and dispersing agent: 2; anti-settling agent: 1; organic silica anti-foaming agent: 0.3 and a preset primer layer pigment: 20, wherein the middle layer is a water-based imitation porcelain coating or an oil-based imitation porcelain coating, wherein the water-based imitation porcelain coating comprises the following major water-based middle layer ingredients by percentage weight: pure water: 28.1; water-based organic silica anti-foaming agent: 0.4; water-based wetting and dispersing agent: 0.5; water-based mildew resistant agent: 0.3; water-based anticorrosive agent: 0.3; precipitated calcium carbonate: 5; ethyl cellulose: 0.2; talcum powder: 5; titanium dioxide rutile: 17; acrylic copolymer emulsion: 40; water-based coalescing agent: 1 and glycol: 2, wherein the oil-based imitation porcelain coating comprises the following major oil-based middle layer ingredients by percentage weight: butyl acetate: 9; ethyl acetate: 7; ethyl cellulose: 24.7; acrylic resin: 30; propylene glycol methyl ether acetate (PGMEA): 6; solvent-based wetting and dispersing agent: 2; anti-settling agent: 1; organic silica anti-foaming agent: 0.3 and a preset middle layer pigment composition: 20, wherein the surface layer is a polyurethane (PU) imitation porcelain surface coating comprising a major surface layer composition and a curing agent, wherein the major surface layer composition comprises the following major surface layer ingredients by percentage weight: butyl acetate: 6; xylene: 5; acrylic polyol resin: 82.7; propylene glycol monomethyl ether acetate: 5; organic silica leveling agent: 1 and organic silica anti-foaming agent: 0.3, wherein the curing agent comprises the following major curing agent ingredients by percentage weight: butyl acetate: 20; xylene: 20 and isocyanate curing agent: 60.

A coating material with imitation ceramic effect comprises a primer layer, a middle layer and a surface layer, wherein the primer layer is poly primer paint material comprising the following major primer layer ingredients by percentage weight: butyl acetate: 5-15; ethyl acetate: 5-15; xylene: 5-10; ethyl cellulose: 18-30; acrylic resin: 25-30; propylene glycol methyl ether acetate (PGMEA): 4-10; solvent-based wetting and dispersing agent: 1-5; bentonite: 0.8-3; organic silica anti-foaming agent: 0.1-0.5 and a preset primer layer pigment: 15-25, wherein the middle layer is a water-based imitation porcelain coating or an oil-based imitation porcelain coating, wherein the water-based imitation porcelain coating comprises the following major water-based middle layer ingredients by percentage weight: pure water: 20-30; water-based organic silica anti-foaming agent: 0.1-0.5; water-based wetting and dispersing agent: 0.1-1; water-based mildew resistant agent: 0.1-0.5; water-based anticorrosive agent: 0.1-0.5; precipitated calcium carbonate: 3-10; ethyl cellulose: 0.1-0.5; talcum powder: 3-10; titanium dioxide rutile: 10-20; acrylic copolymer emulsion: 30-50; water-based coalescing agent: 0.5-2 and glycol: 1-5, wherein the oil-based imitation porcelain coating comprises the following major oil-based middle layer ingredients by percentage weight: butyl acetate: 5-10; ethyl acetate: 5-10; ethyl cellulose: 20-30; acrylic resin: 20-40; propylene glycol methyl ether acetate (PGMEA): 5-10; solvent-based wetting and dispersing agent: 1-5; anti-settling agent: 0.5-3; organic silica anti-foaming agent: 0.1-0.5 and a preset middle layer pigment composition: 10-20, wherein the surface layer is a polyurethane (PU) imitation porcelain surface coating comprising a major surface layer composition and a curing agent, wherein the major surface layer composition comprises the following major surface layer ingredients by percentage weight: butyl acetate: 5-10; xylene: 4-10; acrylic polyol resin: 80-85; propylene glycol monomethyl ether acetate: 4-8; organic silica leveling agent: 0.5-2 and organic silica anti-foaming agent: 0.1-0.5, wherein the curing agent comprises the following major curing agent ingredients by percentage weight: butyl acetate: 15-30; xylene: 15-30 and isocyanate curing agent: 40-65.

A coating material with imitation ceramic effect comprises a primer layer, a middle layer and a surface layer, wherein the primer layer is poly primer paint material comprising the following major primer layer ingredients by percentage weight: butyl acetate: 9; ethyl acetate: 10; xylene: 7; ethyl cellulose: 20; acrylic resin: 25.7; propylene glycol methyl ether acetate (PGMEA): 5; solvent-based wetting and dispersing agent: 2; bentonite: 1; organic silica anti-foaming agent: 0.3; a preset primer layer pigment: 15 and talcum powder: 5, wherein the middle layer is a water-based imitation porcelain coating or an oil-based imitation porcelain coating, wherein the water-based imitation porcelain coating comprises the following major water-based middle layer ingredients by percentage weight: pure water: 28.1; water-based organic silica anti-foaming agent: 0.4; water-based wetting and dispersing agent: 0.5; water-based mildew resistant agent: 0.3; water-based anticorrosive agent: 0.3; precipitated calcium carbonate: 5; ethyl cellulose: 0.2; talcum powder: 5; titanium dioxide rutile: 17; acrylic copolymer emulsion: 40; water-based coalescing agent: 1 and glycol: 2, wherein the oil-based imitation porcelain coating comprises the following major oil-based middle layer ingredients by percentage weight: butyl acetate: 9; ethyl acetate: 7; ethyl cellulose: 24.7; acrylic resin: 30; propylene glycol methyl ether acetate (PGMEA): 6; solvent-based wetting and dispersing agent: 2; anti-settling agent: 1; organic silica anti-foaming agent: 0.3 and a preset middle layer pigment composition: 20, wherein the surface layer is a polyurethane (PU) imitation porcelain surface coating comprising a major surface layer composition and a curing agent, wherein the major surface layer composition comprises the following major surface layer ingredients by percentage weight: butyl acetate: 6; xylene: 5; acrylic polyol resin: 82.7; propylene glycol monomethyl ether acetate: 5; organic silica leveling agent: 1 and organic silica anti-foaming agent: 0.3, wherein the curing agent comprises the following major curing agent ingredients by percentage weight: butyl acetate: 20; xylene: 20 and isocyanate curing agent: 60.

The primer layer material can be mixed and diluted with diluting agent such as thinner composition before use, wherein a weight ratio of the primer layer material and the diluting agent is 1:0.5~1. The middle layer material can be diluted with diluting agent such as pure water and thinner composition before use, wherein a weight ratio of the middle layer material and the diluting agent is 1:0.5~1. The surface layer material can be mixed with curing agent and diluting agent such as thinner composition before use, wherein a weight ratio of surface layer material, curing agent and diluting agent is 1:0.3~1:0.5~1.

The thinner composition used as the diluting agent for the primer layer material mainly includes the following thinner composition ingredients: butyl acetate: 3-10; xylene: 50-60; propylene glycol monomethyl ether acetate: 5-15 and Isophorone: 5-15.

The diluting agent for the water-based middle layer material is pure water. The diluting agent for the oil-based middle layer material is thinner composition in which the thinner composition has the following thinner composition ingredients: butyl acetate: 25; propylene glycol monomethyl ether acetate: 5; isophorone: 5, ethyl acetate: 20 and xylene: 45.

The pigment composition is in the form of a colored paste or colored substances in small powder form. The titanium dioxide rutile includes colored substances in small powder form. The anti-settling agent is bentonite, silica in gaseous phase, or activated polyamide wax.

A method of application of a paint coating, comprising the following steps of:

(1) spraying the primer layer material: the primer layer material is sprayed onto a prefabricated plastic article and the next step is performed after the primer layer material is dried;

(2) spraying or brushing the middle layer material with a first color: the middle layer material is sprayed or brushed onto the entire or a portion of the prefabricated plastic article. Based on the configuration and effect of the article, determine the number of times of spraying or brushing the middle layer material onto the article. Then, the next step is performed after the middle layer material is dried or the next step is performed directly.

(3) spraying or brushing the middle layer material with a second color which is different from the first color. Based on the configuration and effect of the article, determine the number of times of spraying or brushing the middle layer material onto the article. Then, the next step is performed after the middle layer material is dried.

(4) spraying the surface layer material: the PU imitation porcelain material is sprayed on the fabricated plastic article and the plastic article with superior imitation ceramic effect is obtained once the paint is dried.

A method of application of a paint coating, comprising the following steps of:

(1) spraying the primer layer material: the primer layer material, is sprayed onto the entire or a portion of a prefabricated poly article and the next step is performed after the primer layer material is dried;

(2) spraying or brushing the middle layer material with a first color: the middle layer material is sprayed or brushed onto the entire or a portion of the prefabricated poly article. Based on the configuration of the article and the spraying effect, determine the number of times of spraying or brushing the middle layer material onto the article. Then, the next step is performed after the middle layer material is dried or the next step is performed directly.

(3) spraying or brushing the middle layer material with a second color which is different from the first color. Based on the configuration of the article and the spraying effect, determine the number of times of spraying or brushing the middle layer material onto the article. Then, the next step is performed after the middle layer material is dried.

(4) spraying the surface layer material: the PU imitation porcelain material is sprayed on the fabricated poly article and the poly article with superior imitation ceramic effect is obtained once the paint is dried.

The advantageous effect of the present invention is illustrated as follows: First, the coating material with superior imitation ceramic effect according to the preferred embodiment of the present invention can be applied to any fabricated articles made in plastic, poly and other materials such that the fabricated article coated with the coating material of the present invention has a very superior imitation ceramic effect. Second, the coating material of the present invention includes a primer layer, a middle layer and a surface layer materials which can therefore highly increase the imitation ceramic effect on the coated article. Third, through utilizing the application process of the present invention to apply the coating materials of the present invention onto plastic or poly articles, the resulting article has a high level of imitation ceramic effect in which the imitation ceramic article not only has advantages of good mechanical properties, high level of corrosive resistant ability and easy to clean, but also can effectively reduce the exploitation and use of kaolin, clay, porcelain stone, china clay, coloring agent, blue and white porcelain material, organic soil such as lime glaze and lime-alkali glaze, thereby minimizing the consumption requirement of natural resources. Finally, since the material of the present invention is soluble in soil, therefore the present invention can effectively decrease the level of pollution and damages to the environment and hence lessen the health hazards to human. Through utilizing the material and the application process of the present invention, the imitation ceramic articles prepared by the material and the application process according to the preferred embodiment of the present invention can largely replace the real ceramic article.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The preferred embodiment of the present invention is further described as follows:

Embodiment 1: Application of the coating material with superior imitation ceramic effect onto a prefabricated plastic article according to the preferred embodiment of the present invention.

A coating material with imitation ceramic effect comprises a primer layer material, a middle layer material and a surface layer material, wherein the primer layer material is a plastic primer material comprising the following major primer layer ingredients by percentage weight: butyl acetate: 5-10; ethyl acetate: 5-10; thermosetting acrylic resin: 50-60; propylene glycol methyl ether acetate (PGMEA): 3-10; solvent-based wetting and dispersing agent: 1-5; anti-settling agent: 1-2; organic silica anti-foaming agent: 0.1-0.5 and a preset primer layer pigment: 10-30. The above primer layer ingredients are mixed and grinded to obtain the plastic primer material which can be applied to any plastic articles or prefabricated plastic articles. Preferably, the preset primer layer pigment is a colored paste or colored powder with small or tiny particle size. The titanium dioxide rutile is a colored powder with small or tiny particle size. If the primer layer pigment which is being added is powder form of titanium dioxide rutile, a resulting white-colored material is obtained. If a particular colored material is required, a colored paste or colored powder of a particular color can be selectively added. The plastic primer material can be pre-mixed with a diluting agent such as a thinner composition before use and the weight ratio of the plastic primer material and the diluting agent is 1:0.5~1, wherein the thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

The middle layer material is a water-based imitation porcelain coating or an oil-based imitation porcelain coating, wherein the water-based imitation porcelain coating comprises the following major water-based middle layer ingredients by percentage weight: pure water: 20-30; water-based organic silica anti-foaming agent: 0.1-0.5; water-based wetting and dispersing agent: 0.1-1; water-based mildew resistant agent: 0.1-0.5; water-based anticorrosive agent: 0.1-0.5; precipitated calcium carbonate: 3-10; ethyl cellulose: 0.1-0.5; talcum powder: 3-10; titanium dioxide rutile: 10-20; acrylic copolymer emulsion: 30-50; water-based coalescing agent: 0.5-2 and glycol: 1-5, wherein the oil-based imitation porcelain coating comprises the following major oil-based middle layer ingredients by percentage weight: butyl acetate: 5-10; ethyl acetate: 5-10; ethyl cellulose: 20-30; acrylic resin: 20-40; propylene glycol methyl ether acetate (PGMEA): 5-10; solvent-based wetting and dispersing agent: 1-5; anti-settling agent: 0.5-3; organic silica anti-foaming agent: 0.1-0.5 and a preset middle layer pigment composition: 10-20. The above middle layer ingredients are mixed according to the percentage weight and are grinded to obtain the water-based or the oil-based middle layer material which can be diluted by pure water or diluting agent such as thinner composition respectively before use. The diluting agent for the water-based middle layer material is pure water, and the weight ratio of the middle layer material and the pure water is 1:05~1. The diluting agent for the oil-based middle layer material is thinner composition, and the weight ratio of the middle layer material and the thinner composition is 1:05~1. The thinner composition mainly includes the following thinner composition ingredients by weight: butyl acetate: 25; propylene glycol monomethyl ether acetate: 5, isophorone: 5, ethyl acetate: 20 and xylene: 45. Preferably, the preset middle layer pigment is a colored paste or colored powder with small or tiny particle size. The titanium dioxide rutile is a colored powder with small or tiny particle size. If the middle layer pigment which is being added is powder form of titanium dioxide rutile, a resulting white-colored material is obtained. If a particular colored material is required, a colored paste or colored powder of a particular color can be selectively added. The anti-settling agent is bentonite, silica in gaseous phase, or activated polyamide wax.

The surface layer material is a polyurethane (PU) imitation porcelain surface coating comprising a major surface layer composition and a curing agent, wherein the major surface layer composition comprises the following major surface layer ingredients by weight: butyl acetate: 5-10; xylene: 4-10; acrylic polyol resin: 80-85; propylene glycol monomethyl ether acetate: 4-8; organic silica leveling agent: 0.5-2 and organic silica anti-foaming agent: 0.1-0.5, wherein the curing agent comprises the following major curing agent ingredients by weight: butyl acetate: 15-30; xylene: 15-30 and isocyanate curing agent: 40-65. The ingredients according to the above weight ratio is mixed and grinded to obtain the PU imitation porcelain surface coating material which can be mixed with the curing agent or a thinner composition before use. The weight ratio of the surface layer material, the curing agent and the thinner composition is 1:0.3~1:0.5~1. The thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

An application process of the above coating material with imitation ceramic effect comprises the following steps:

(1) spraying the primer layer material: the primer layer material is sprayed onto a prefabricated plastic article and the next step is performed after the primer layer material is dried, wherein if the room temperature is ≥20° C., the time required for natural drying is 30 minutes, wherein if the room temperature is ≤20° C., the time required for natural drying is longer than 1 hour, wherein if an oven is used and set to 70° C., the time required is about 15 minutes or above;

(2) spraying or brushing the middle layer material with a first color: the middle layer material is sprayed or brushed onto the entire or a portion of the prefabricated plastic article. Based on the configuration of the article and the spraying effect, determine the number of times of spraying or brushing the middle layer material onto the article. The number of times of spraying or brushing can be one or above. Then, the next step is performed after the middle layer material is dried or the next step is performed directly. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(3) spraying or brushing the middle layer material with a second color which is different from the first color. Based on the configuration of the article and the spraying effect, determine the number of times of spraying or brushing the middle layer material onto the article. Then, the next step is performed after the middle layer material is dried. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(4) spraying the surface layer material: the PU imitation porcelain material is sprayed onto the fabricated plastic article and the plastic article with superior imitation ceramic effect is obtained once the paint is dried.

Embodiment 2: Application of the coating material with superior imitation ceramic effect onto a prefabricated plastic article according to the preferred embodiment of the present invention.

A coating material with imitation ceramic effect comprises a primer layer material, a middle layer material and a surface layer material, wherein the primer layer material is a plastic primer material comprising the following major primer layer ingredients by percentage weight: butyl acetate:

9; ethyl acetate: 7; thermosetting acrylic resin: 55.7; propylene glycol methyl ether acetate (PGMEA): 5; solvent-based wetting and dispersing agent: 2; anti-settling agent: 1; organic silica anti-foaming agent: 0.3 and a preset primer layer pigment: 10-30. The above primer layer ingredients with the above percentage weight are mixed and grinded to obtain the plastic primer material in white color which can be applied to any plastic articles or prefabricated plastic articles. The titanium dioxide rutile can be replaced by other colored paste or colored powder with small or tiny particle size. If the primer layer pigment which is being added is powder form of titanium dioxide rutile, a resulting white-colored material is obtained. If a particular colored material is required, a colored paste or colored powder of a particular color can be selectively added. The white-colored material can be pre-mixed with a diluting agent such as a thinner composition before use and the weight ratio of the material and the diluting agent is 1:0.5~1, wherein the thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

The middle layer material is a water-based imitation porcelain coating or an oil-based imitation porcelain coating, wherein the water-based imitation porcelain coating comprises the following major water-based middle layer ingredients by percentage weight: pure water: 28.1; water-based organic silica anti-foaming agent: 0.4; water-based wetting and dispersing agent: 0.5; water-based mildew resistant agent: 0.3; water-based anticorrosive agent: 0.3; precipitated calcium carbonate: 5; ethyl cellulose: 0.2; talcum powder: 5; titanium dioxide rutile: 17; acrylic copolymer emulsion: 40; water-based coalescing agent: 1 and glycol: 2, wherein the oil-based imitation porcelain coating comprises the following major oil-based middle layer ingredients by percentage weight: butyl acetate: 9; ethyl acetate: 7; ethyl cellulose: 24.7; acrylic resin: 30; propylene glycol methyl ether acetate (PGMEA): 6; solvent-based wetting and dispersing agent: 2; anti-settling agent: 1; organic silica anti-foaming agent: 0.3 and a preset middle layer pigment composition: 20. The above middle layer ingredients are mixed according to the percentage weight and are grinded to obtain the water-based or the oil-based middle layer material which can be diluted by pure water or diluting agent such as thinner composition respectively before use. The diluting agent for the water-based middle layer material is pure water, and the weight ratio of the middle layer material and the pure water is 1:05~1. The diluting agent for the oil-based middle layer material is thinner composition, and the weight ratio of the middle layer material and the thinner composition is 1:05~1. The thinner composition mainly includes the following thinner composition ingredients by weight: butyl acetate: 25; propylene glycol monomethyl ether acetate: 5, isophorone: 5, ethyl acetate: 20 and xylene: 45. Preferably, the preset middle layer pigment is a colored paste or colored powder with small or tiny particle size. The titanium dioxide rutile is a colored powder with small or tiny particle size. If the middle layer pigment which is being added is powder form of titanium dioxide rutile, a resulting white-colored material is obtained. If a particular colored material is required, a colored paste or colored powder of a particular color can be selectively added. The anti-settling agent is bentonite, silica in gaseous phase, or activated polyamide wax.

The surface layer material is a polyurethane (PU) imitation porcelain surface coating comprising a major surface layer composition and a curing agent, wherein the major surface layer composition comprises the following major surface layer ingredients by weight: butyl acetate: 6; xylene: 5; acrylic polyol resin: 82.7; propylene glycol monomethyl ether acetate: 5; organic silica leveling agent: 1 and organic silica anti-foaming agent: 0.3, wherein the curing agent comprises the following major curing agent ingredients by weight: butyl acetate: 20; xylene: 20 and isocyanate curing agent: 60. The ingredients according to the above weight ratio are mixed and grinded to obtain the PU imitation porcelain surface coating material which can be mixed with the curing agent or a thinner composition before use. The weight ratio of the surface layer material, the curing agent and the thinner composition is 1:0.3~1:0.5~1. The thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

An application process of the above coating material with imitation ceramic effect according to the embodiment 2 of the preferred embodiment of the present invention comprises the following steps:

(1) spraying the primer layer material: the primer layer material is sprayed onto a prefabricated plastic article and the next step is performed after the primer layer material is dried, wherein if the room temperature is ≥20° C., the time required for natural drying is 30 minutes, wherein if the room temperature is ≤20° C., the time required for natural drying is longer than 1 hour, wherein if an oven is used and set to 70° C., the time required is about 15 minutes or above;

(2) spraying or brushing the middle layer material with a first color: the middle layer material is sprayed or brushed onto the entire or a portion of the prefabricated plastic article. Based on the configuration of the article and the spraying effect, determine the number of times of spraying or brushing the middle layer material onto the article. The number of times of spraying or brushing can be one or above. Then, the next step is performed after the middle layer material is dried or the next step is performed directly. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(3) spraying or brushing the middle layer material with a second color which is different from the first color. Based on the configuration of the article and the spraying effect, determine the number of times of spraying or brushing the middle layer material with a second color onto the article. Then, the next step is performed after the middle layer material is dried. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(4) spraying the surface layer material: the PU imitation porcelain material is sprayed onto the fabricated plastic article and the plastic article with superior imitation ceramic effect is obtained once the paint is dried.

Embodiment 3: Application of the coating material with superior imitation ceramic effect onto a prefabricated poly article according to the preferred embodiment of the present invention.

A coating material with imitation ceramic effect comprises a primer layer, a middle layer and a surface layer, wherein the primer layer is a poly primer paint material comprising the following major primer layer ingredients by percentage weight: butyl acetate: 9; ethyl acetate: 10; xylene: 7; ethyl cellulose: 20; acrylic resin: 25.7; propylene glycol methyl ether acetate (PGMEA): 5; solvent-based wetting and dispersing agent: 2; bentonite: 1; organic silica anti-foaming agent: 0.3; a preset primer layer pigment: 15 and talcum powder: 5. The above primer layer ingredients with the above percentage weight are mixed and grinded to obtain the poly primer material which can be applied to any poly articles or prefabricated poly articles. Preferably, the preset primer layer pigment is a colored paste or colored powder with small or tiny particle size. The titanium dioxide rutile is a colored powder with small or tiny particle size. If the primer layer pigment which is being added is powder form of titanium dioxide rutile, a resulting white-colored material is obtained. If a particular colored material is required, a colored paste or colored powder of a particular color can be selectively added. The poly primer material can be pre-mixed with a diluting agent such as a thinner composition before use and the weight ratio of the plastic primer material and the diluting agent is 1:0.5~1, wherein the thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

The middle layer is a water-based imitation porcelain coating or an oil-based imitation porcelain coating, wherein the water-based imitation porcelain coating comprises the following major water-based middle layer ingredients by percentage weight: pure water: 20-30; water-based organic silica anti-foaming agent: 0.1-0.5; water-based wetting and dispersing agent: 0.1-1; water-based mildew resistant agent: 0.1-0.5; water-based anticorrosive agent: 0.1-0.5; precipitated calcium carbonate: 3-10; ethyl cellulose: 0.1-0.5; talcum powder: 3-10; titanium dioxide rutile: 10-20; acrylic copolymer emulsion: 30-50; water-based coalescing agent: 0.5-2 and glycol: 1-5, wherein the oil-based imitation porcelain coating comprises the following major oil-based middle layer ingredients by percentage weight: butyl acetate: 5-10; ethyl acetate: 5-10; ethyl cellulose: 20-30; acrylic resin: 20-40; propylene glycol methyl ether acetate (PGMEA): 5-10; solvent-based wetting and dispersing agent: 1-5; anti-settling agent: 0.5-3; organic silica anti-foaming agent: 0.1-0.5 and a preset middle layer pigment composition: 10-20. The above middle layer ingredients are mixed according to the percentage weight and are grinded to obtain the water-based or the oil-based middle layer material which can be diluted by pure water or diluting agent such as thinner composition respectively before use. The diluting agent for the water-based middle layer material is pure water, and the weight ratio of the middle layer material and the pure water is 1:05~1. The diluting agent for the oil-based middle layer material is thinner composition, and the weight ratio of the middle layer material and the thinner composition is 1:05~1. The thinner composition mainly includes the following thinner composition ingredients by weight: butyl acetate: 25; propylene glycol monomethyl ether acetate: 5, isophorone: 5, ethyl acetate: 20 and xylene: 45. Preferably, the preset middle layer pigment is a colored paste or colored powder with small or tiny particle size. The titanium dioxide rutile is a colored powder with small or tiny particle size. If the middle layer pigment which is being added is powder form of titanium dioxide rutile, a resulting white-colored material is obtained. If a particular colored material is required, a colored paste or colored powder of a particular color can be selectively added. The anti-settling agent is bentonite, silica in gaseous phase, or activated polyamide wax.

The surface layer is a polyurethane (PU) imitation porcelain surface coating comprising a major surface layer composition and a curing agent, wherein the major surface layer composition comprises the following major surface layer ingredients by percentage weight: butyl acetate: 5-10; xylene: 4-10; acrylic polyol resin: 80-85; propylene glycol monomethyl ether acetate: 4-8; organic silica leveling agent: 0.5-2 and organic silica anti-foaming agent: 0.1-0.5, wherein the curing agent comprises the following major curing agent ingredients by percentage weight: butyl acetate: 15-30; xylene: 15-30 and isocyanate curing agent: 40-65. The ingredients according to the above weight ratio are mixed and grinded to obtain the PU imitation porcelain surface coating material which can be mixed with the curing agent or a thinner composition before use. The weight ratio of the surface layer material, the curing agent and the thinner composition is 1:0.3~1:0.5~1. The thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

An application process of the above coating material with imitation ceramic effect according to the embodiment 3 of the preferred embodiment of the present invention comprises the following steps:

(1) spraying the primer layer material: the primer layer material is sprayed onto a prefabricated poly article and the next step is performed after the primer layer material is dried, wherein if the room temperature is ≥20° C., the time required for natural drying is 3 minutes, wherein if the room temperature is ≤20° C., the time required for natural drying is longer than 1 hour, wherein if an oven is used and set to 70° C., the time required is about 15 minutes or above;

(2) spraying or brushing the middle layer material with a first color: the middle layer material is sprayed or brushed onto the entire or a portion of the prefabricated poly article. Based on the configuration of the article and the spraying effect, determine the number of times of spraying or brushing the middle layer material onto the article. The number of times of spraying or brushing can be one or above. Then, the next step is performed after the middle layer material is dried. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(3) spraying or brushing the middle layer material with a second color which is different from the first color. Based on the configuration of the article and the spraying effect, determine the number of times of spraying or brushing the middle layer material onto the article. Then, the next step is performed after the middle layer material is dried. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(4) spraying the surface layer material: the PU imitation porcelain material is sprayed onto the fabricated poly article and the poly article with superior imitation ceramic effect is obtained once the paint is dried.

Embodiment 4: Application of the coating material with superior imitation ceramic effect onto a prefabricated poly article according to the preferred embodiment of the present invention.

A coating material with imitation ceramic effect comprises a primer layer, a middle layer and a surface layer, wherein the primer layer is a poly primer paint material comprising the following major primer layer ingredients by percentage weight: butyl acetate: 9; ethyl acetate: 10; xylene: 7; ethyl cellulose: 20; acrylic resin: 25.7; propylene glycol methyl ether acetate (PGMEA): 5; solvent-based wetting and dispersing agent: 2; bentonite: 1; organic silica anti-foaming agent: 0.3; a preset primer layer pigment: 15 and talcum powder: 5. The above primer layer ingredients with the above percentage weight are mixed and grinded to obtain the poly primer material which can be applied to any poly articles or prefabricated poly articles. The titanium dioxide rutile can be replaced by other colored paste or colored powder with small or tiny particle size. If the primer layer pigment which is being added is powder form of titanium dioxide rutile, a resulting white-colored material is obtained. If a particular colored material is required, a colored paste or colored powder of a particular color can be selectively added. The white-colored material can be premixed with a diluting agent such as a thinner composition before use and the weight ratio of the material and the diluting agent is 1:0.5~1, wherein the thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

The middle layer is a water-based imitation porcelain coating or an oil-based imitation porcelain coating, wherein the water-based imitation porcelain coating comprises the following major water-based middle layer ingredients by percentage weight: pure water: 28.1; water-based organic silica anti-foaming agent: 0.4; water-based wetting and dispersing agent: 0.5; water-based mildew resistant agent: 0.3; water-based anticorrosive agent: 0.3; precipitated calcium carbonate: 5; ethyl cellulose: 0.2; talcum powder: 5; titanium dioxide rutile: 17; acrylic copolymer emulsion: 40; water-based coalescing agent: 1 and glycol: 2, wherein the oil-based imitation porcelain coating comprises the following major oil-based middle layer ingredients by percentage weight: butyl acetate: 9; ethyl acetate: 7; ethyl cellulose: 24.7; acrylic resin: 30; propylene glycol methyl ether acetate (PGMEA): 6; solvent-based wetting and dispersing agent: 2; anti-settling agent: 1; organic silica anti-foaming agent: 0.3 and a preset middle layer pigment composition: 20. The above middle layer ingredients are mixed according to the percentage weight and are grinded to obtain the water-based or the oil-based middle layer material which can be diluted by pure water or diluting agent such as thinner composition respectively before use. The diluting agent for the water-based middle layer material is pure water, and the weight ratio of the middle layer material and the pure water is 1:05~1. The diluting agent for the oil-based middle layer material is thinner composition, and the weight ratio of the middle layer material and the thinner composition is 1:05~1. The thinner composition mainly includes the following thinner composition ingredients by weight: butyl acetate: 25; propylene glycol monomethyl ether acetate: 5, isophorone: 5, ethyl acetate: 20 and xylene: 45. Preferably, the preset middle layer pigment is a colored paste or colored powder with small or tiny particle size. The titanium dioxide rutile is a colored powder with small or tiny particle size. If the middle layer pigment which is being added is powder form of titanium dioxide rutile, a resulting white-colored material is obtained. If a particular colored material is required, a colored paste or colored powder of a particular color can be selectively added. The anti-settling agent is bentonite, silica in gaseous phase, or activated polyamide wax.

The surface layer is a polyurethane (PU) imitation porcelain surface layer coating comprising a major surface layer composition and a curing agent, wherein the major surface layer composition comprises the following major surface layer ingredients by percentage weight: butyl acetate: 6; xylene: 5; acrylic polyol resin: 82.7; propylene glycol monomethyl ether acetate: 5; organic silica leveling agent: 1 and organic silica anti-foaming agent: 0.3, wherein the curing agent comprises the following major curing agent ingredients by percentage weight: butyl acetate: 20; xylene: 20 and isocyanate curing agent: 60. The ingredients according to the above weight ratio are mixed and grinded to obtain the PU imitation porcelain surface coating material which can be mixed with the curing agent or a thinner composition before use. The weight ratio of the surface layer material, the curing agent and the thinner composition is 1:0.3~1:0.5~1. The thinner composition mainly includes the following thinner composition ingredients by weight: butyl acetate: 3-10; xylene: 50-60; propylene glycol monomethyl ether acetate: 5-15 and isophorone: 5-15. Preferably and in particular, the thinner composition includes the following thinner composition ingredients by weight: butyl acetate: 5; xylene: 52; propylene glycol monomethyl ether acetate: 10 and isophorone: 8.

An application process of the above coating material with imitation ceramic effect according to the embodiment 4 of the preferred embodiment of the present invention comprises the following steps:

(1) spraying the primer layer material: the primer layer material is sprayed onto a prefabricated poly article and the next step is performed after the primer layer material is dried, wherein if the room temperature is ≥20° C., the time required for natural drying is 3 minutes, wherein if the room temperature is ≤20° C., the time required for natural drying is longer than 1 hour, wherein if an oven is used and set to 70° C., the time required is about 15 minutes or above;

(2) spraying or brushing the middle layer material with a first color: the middle layer material is sprayed or brushed onto the entire or a portion of the prefabricated poly article. Based on the configuration of the article and the spraying effect, determine the number of times of spraying or brushing the middle layer material onto the article. The number of times of spraying or brushing can be one or above. Then, the next step is performed after the middle layer material is dried. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(3) spraying or brushing the middle layer material with a second color which is different from the first color. Based on the configuration of the article and the spraying effect, determine the number of times of spraying or brushing the middle layer material onto the article. Then, the next step is performed after the middle layer material is dried. If the humidity is ≤70% and the room temperature is ≥20° C., the time required for drying is 12 hours or above. If the humidity is ≥70% and the room temperature is ≤20° C., the time required for drying is 24 hours or above. If the humidity is ≥85% or the room temperature is ≤10° C., the use of an oven is preferred, the oven temperature is set at 70° C. and the time required for drying is 1 hour.

(4) spraying the surface layer material: the PU imitation porcelain material is sprayed onto the fabricated poly article and the poly article with superior imitation ceramic effect is obtained once the paint is dried.

It is worth mentioning that the term "ceramic" refers to pots, vases and other articles made from clay hardened by heat which has specific appearance, shade, color and particular gloss. According to the present invention, the imitation ceramic effect refers to the appearance, shade, color and painting effect of an article which is closely imitative of a ceramic article. The imitation ceramic effect has achieved a particular depth of ceramic effect, which at least includes the appearance, shade, color, painting as well as the color depth and the glaze streaming and glaze change effect.

The present invention can be applied to any fabricated articles made in plastic, poly and other materials such that the fabricated article coated with the coating material of the present invention has a very superior imitation ceramic effect. Like the authentic ceramic article, the fabricated article produced by the present invention has good mechanical properties, high level of corrosive resistant ability and easy to clean.

Traditional authenticate ceramic article is made in clay and heating under high temperature for a long period of time is required for its process of manufacture to obtain the resulting glaze streaming and glaze changing effect, which is a unique characteristic effect of a ceramic. The term "ceramic article" in the present invention refers to articles made in clay and a process of high temperature heating is required for its production.

According to the present invention, the characteristic effect of a ceramic, which includes the glaze streaming and glaze changing effect, can be achieved through the use of the particular painting materials onto an article which is primarily a plastics and unsaturated polyester article. In other words, the imitation ceramic effect can be produced under room temperature without high temperature heating to achieve the glaze streaming and glaze changing effect of a ceramic article through the use of the compositions as claimed in the present invention.

An authentic ceramic article is specific and unique in that its appearance involves a plurality of layers which is resulted from a process of heating. In particular, the glaze streaming and glaze changing effect of a ceramic article cannot be obtained through simple application of different layer of painting.

The appearance, shade, color and painting effect of an article using the composition of the present invention to apply onto the article can produce an imitation ceramic effect, which is highly imitative. The composition is unique and it is not possible to do so without the object of producing an imitation ceramic effect. The appearance, shade, color and painting effect, as well as the color depth or the glaze streaming and glaze change effect, which is the imitation ceramic effect, can only be achieved by the specific composition of the present invention with the object of making a composition to produce an imitation ceramic effect.

Figure 1:
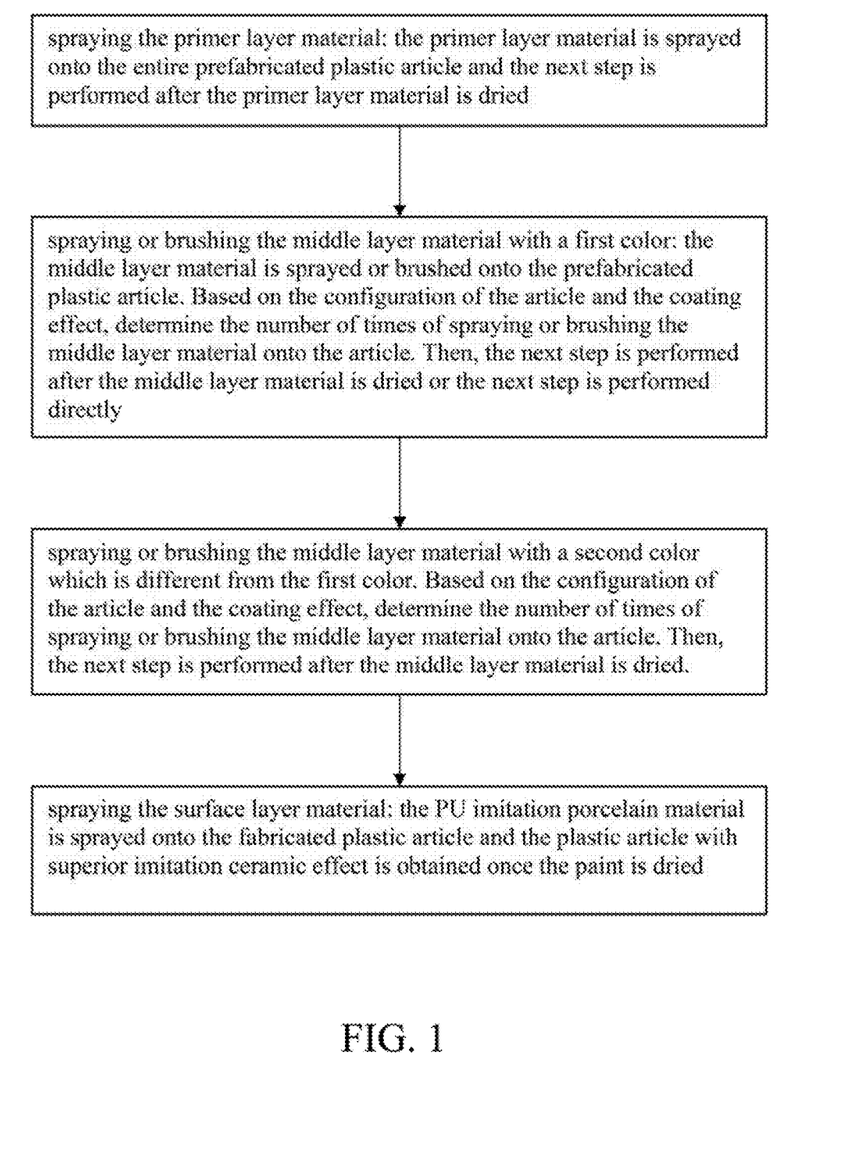
FIG. 1 is a flow chart illustrating exemplary embodiments 1 and 2 of the application process according to a preferred embodiment of the present invention.
Figure 2:
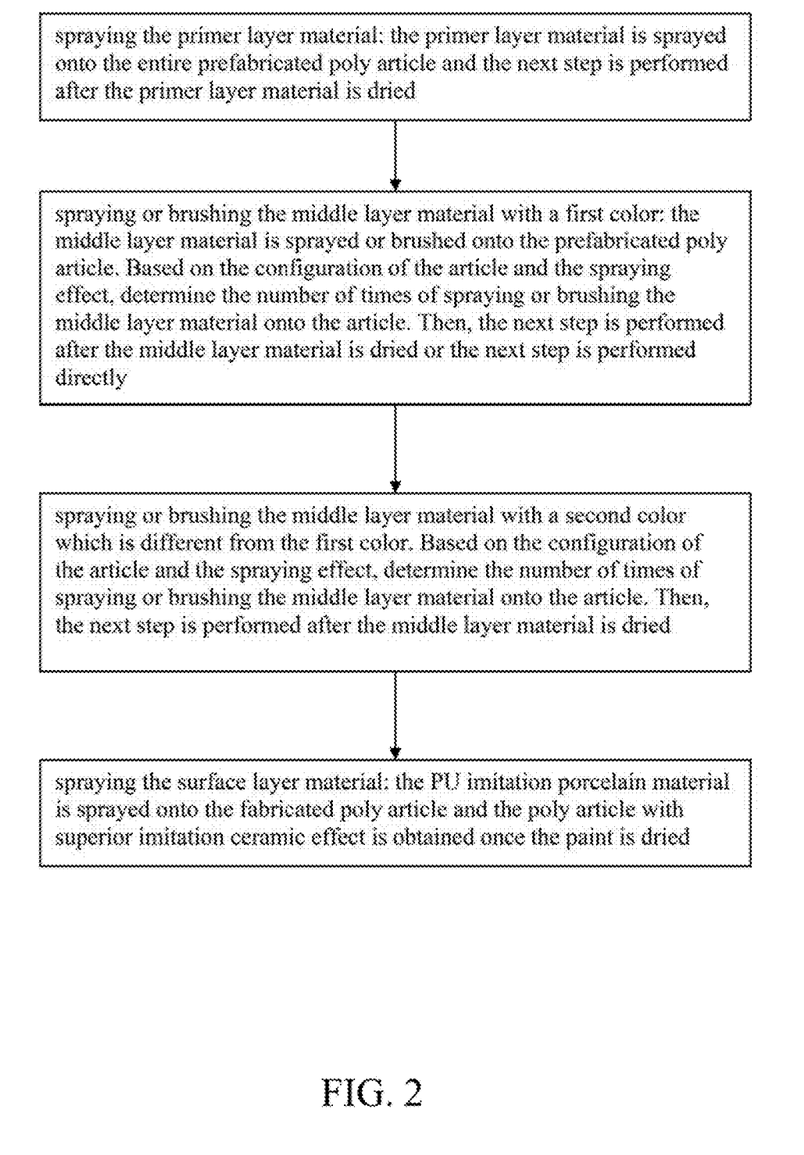
FIG. 2 is a flow chart illustrating exemplary embodiments 3 and 4 of the application process according to the above preferred embodiment of the present invention.
Figure 3:
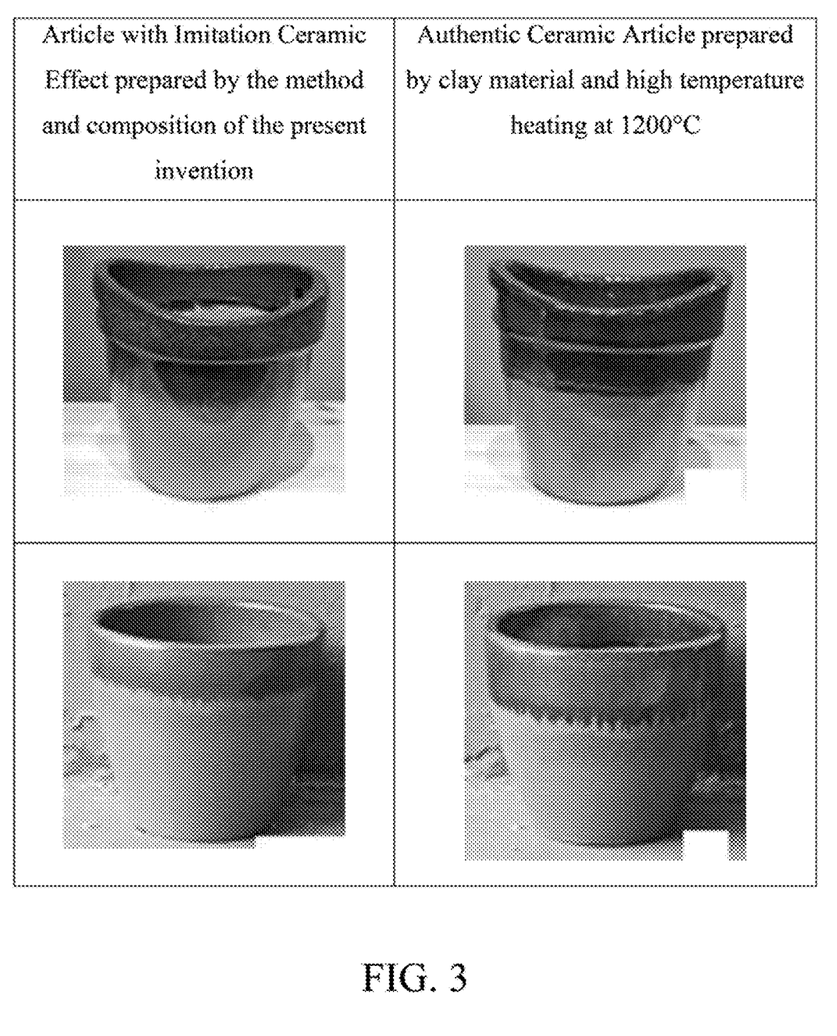
FIG. 3 is an illustration of a side-by-side comparison of an authentic ceramic article prepared by clay material and high temperature heating at 1200° C. and an object produced by the paint material of the present invention.

The authentic ceramic article refers to pots, vase and the like. The term "ceramic" has a particular meaning and understanding in Chinese. Referring to FIG. 3 of the drawings, a side by side comparison of the article with imitation ceramic effect of the present invention and the authentic ceramic article are illustrated. The articles look like the same.

Figure 4:
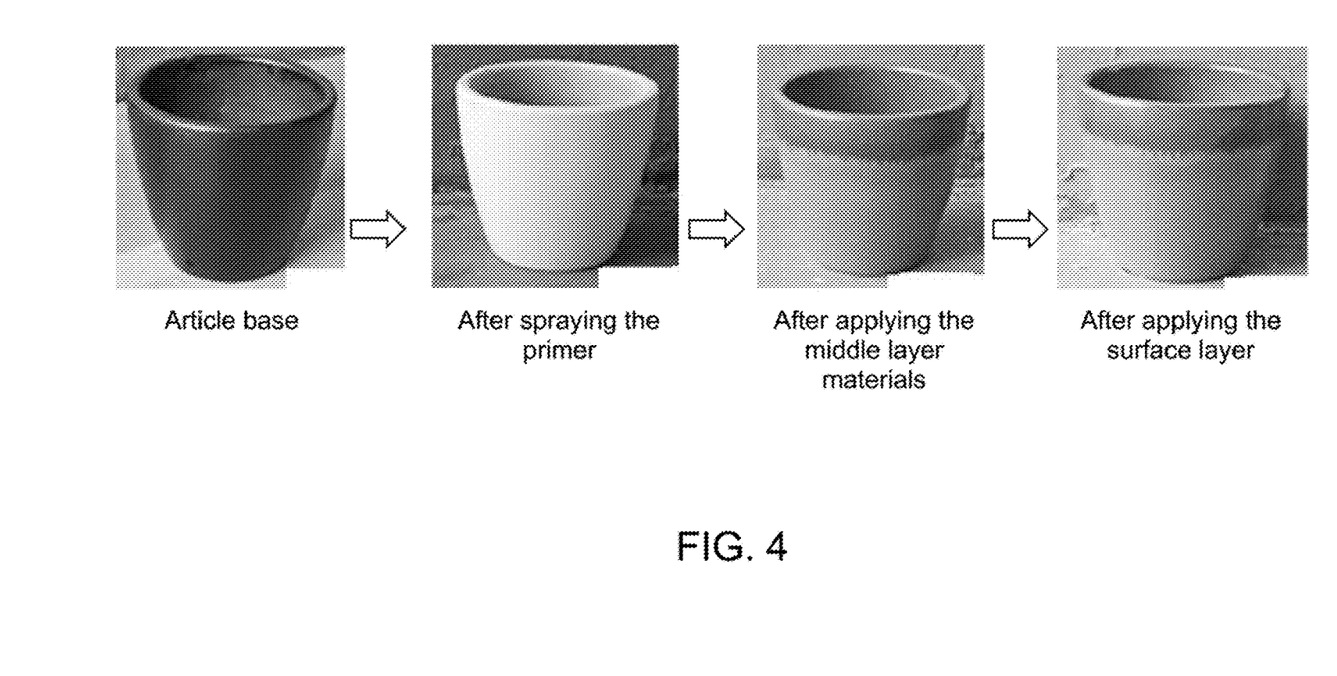
FIG. 4 is an illustration of the application process on a pot article according to the present invention.

Referring to FIG. 4 of the drawings, an illustration of the process of the present invention is illustrated. As shown in FIG. 4, a plastic flower pot base is the article base, which is the object. The step-by-step changes in appearance of the flower pot base is illustrated. It is worth mentioning that the resulting article has a highly imitation ceramic effect when compared to the authentic ceramic article.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A paint coating material for producing a flower pot object having an imitation ceramic effect, said imitation ceramic effect refers to appearance, shade, color and painting effect on an article which is closely imitative to an authenticated ceramic article and at least comprises appearance, shade, color, painting, color depth, glaze streaming and glaze change effect of the authenticate ceramic article, comprising:

a primer layer composition, a middle layer composition and a surface layer composition arranged for applying onto a flower pot base sequentially, wherein said flower pot object being produced is recyclable, wherein said primer layer composition by percentage weight of said primer layer composition is a plastic primer paint material comprising a sequential mixing order of ingredients comprising: 5-10% butyl acetate by weight; 5-10% ethyl acetate by weight; 50-60% thermosetting acrylic resin by weight; 3-10% propylene glycol methyl ether acetate (PGMEA) by weight; 1-5% solvent-based wetting and dispersing agent by weight; 1-2% anti-settling agent by weight; 0.1-0.5% organic silicon defoamer by weight; and 10-30% of a primer layer pigment composition by weight;

wherein said middle layer composition by percentage weight of said middle layer composition is a water-based imitation porcelain coating material comprising a sequential mixing order of ingredients comprising: 20-30% pure water by weight; a first 0.1-0.5% water-based organic silicon defoamer by weight; 0.1-1% water-based wetting and dispersing agent by weight; 0.1-0.5% water-based mildew resistant agent by weight; 0.1-0.5% water-based anticorrosive agent by weight; 3-10% precipitated calcium carbonate by weight; 0.1-0.5% ethyl cellulose by weight; 10-20% talcum powder by weight; 10-20% titanium dioxide rutile by weight; 30-50% acrylic copolymer emulsion by weight; a second 0.1-0.5% water-based organic silicon defoamer by weight; 0.5-2% water-based coalescing agent by weight and 1-5% glycol by weight, wherein said first and second water-based organic silicon defoamer by weight are identical in composition by percentage weight of said first surface coating composition and are adapted for using in different steps during the preparation of said middle layer composition;

wherein said surface layer composition by percentage weight of said surface layer composition is a polyurethane imitation porcelain surface coating material comprising a first surface coating composition and a second surface coating composition to be applied onto the object in sequence , wherein said first surface coating composition is prepared by sequentially mixing: 5-10% butyl acetate by weight; 4-10% xylene by weight; 80-85% acrylic polyol resin; 4-8% propylene glycol monomethyl ether acetate; 0.5-5% organic silicon leveling agent and 0.1-0.5% of organic silicon defoamer by weight, wherein said second surface coating composition by percentage weight of said second surface coating composition is a curing agent which is prepared by: 15-30% butyl acetate by weight; 15-30% xylene by weight and 40-65% isocyanate curing agent by weight.

2. A paint coating material for producing a flower pot object having an imitation ceramic effect, said imitation ceramic effect refers to appearance, shade, color and painting effect on an article which is closely imitative to an authenticated ceramic article and at least comprises appearance, shade, color, painting, color depth, glaze streaming and glaze change effect of the authenticate ceramic article, comprising:

a primer layer composition, a middle layer composition and a surface layer composition arranged for applying onto a flower pot base sequentially, wherein said flower pot object being produced is recyclable, wherein said primer layer composition by percentage weight of said primer layer composition is a plastic primer paint material, said plastic primer paint material by percentage weight of said primer layer composition comprises a sequential mixing order of ingredients comprising: 9% butyl acetate by weight; 7% ethyl acetate by weight; 55.7% thermosetting acrylic resin by weight; 5% propylene glycol methyl ether acetate (PGMEA) by weight; 2% solvent-based wetting and dispersing agent by weight; 1% anti-settling agent by weight; 0.3% organic silicon defoamer by weight; and 20% of a primer layer pigment composition by weight;

wherein said middle layer composition by percentage weight of said middle layer composition is a water-based imitation porcelain coating material, said water-based imitation porcelain coating material by percentage weight of said water-based imitation porcelain coating material comprises a sequential mixing order of ingredients comprising: 28.1% pure water by weight; 0.4% first water-based organic silicon defoamer by weight; 0.5% water-based wetting and dispersing agent by weight; 0.3% water-based mildew resistant agent by weight; 0.3% water-based anticorrosive agent by weight; 5% precipitated calcium carbonate by weight; 0.2% ethyl cellulose by weight; 5% talcum powder by weight; 17% titanium dioxide rutile by weight; 40% acrylic copolymer emulsion by weight; 0.2% second water-based organic silicon defoamer by weight; 1% water-based coalescing agent by weight and 2% glycol by weight, wherein said first and second water-based organic silicon defoamer by weight are identical in composition and are adapted for using in different steps during the preparation of said middle layer composition;

wherein said surface layer composition by percentage weight of said surface layer composition is a polyurethane imitation porcelain surface coating material comprising a first surface coating composition and a second surface coating composition to be applied onto the object in sequence, said first surface coating composition of said polyurethane imitation porcelain surface coating material of said surface layer by percentage weight of said first surface coating composition comprises a sequential mixing order of ingredients comprising: 6% butyl acetate by weight; 5% xylene by weight; 82.7% acrylic polyol resin; 5% propylene glycol monomethyl ether acetate; 1% organic silicon leveling agent and 0.3% of organic silicon defoamer by weight, wherein said second surface coating composition of said surface layer by percentage weight of said second surface coating composition comprises: 20% butyl acetate by weight; 20% xylene by weight and 60% isocyanate curing agent by weight.

3. The paint coating material, as recited in claim 1, further comprising:

a primer layer diluting agent to dilute said primer layer material and to facilitate an application of said primer layer material, wherein a weight ratio of said primer layer material and said primer layer diluting agent is 1:0.5-1 and said primer layer diluting agent is a thinner composition of said primer layer;

a middle layer diluting agent to dilute said middle layer material and to facilitate an application of said middle layer material, wherein a weight ratio of said middle layer material and said middle layer diluting agent is 1:0.5-1 and said middle layer diluting agent is pure water for said water-based imitation porcelain coating material of said middle layer; and a curing agent and a diluting agent for said surface layer material to mix with said surface layer material to facilitate an application of said surface layer, wherein a weight ratio of said surface layer material, said curing agent and said diluting agent of said surface layer material is 1:0.3-1:0.5-1 and said diluting agent is a thinner composition for said surface layer.

4. The paint coating material, as recited in claim 2, further comprising:

a primer layer diluting agent to dilute said primer layer material and to facilitate an application of said primer layer material, wherein a weight ratio of said primer layer material and said primer layer diluting agent is 1:0.5-1 and said primer layer diluting agent is a thinner composition of said primer layer;

a middle layer diluting agent to dilute said middle layer material and to facilitate an application of said middle layer material, wherein a weight ratio of said middle layer material and said middle layer diluting agent is 1:0.5-1 and said middle layer diluting agent is pure water for said water-based imitation porcelain coating material of said middle layer ; and a curing agent and a diluting agent to mix with said surface layer material to facilitate an application of said surface layer, wherein a weight ratio of said surface layer material, said curing agent and said diluting agent of said surface layer material is 1:0.3-1:0.5-1 and said diluting agent is a thinner composition for said surface layer.

5. A method of application of the paint coating material according to claim 1, wherein the flower pot base is a plastic base, comprising the steps of:
   (a) spraying a primer layer material onto the flower pot base and allowing said primer layer material to dry;
   (b) spraying or brushing a first middle layer material having a first color onto the flower pot base;
   (c) repeating step (b) based on a configuration of the flower pot base and an effect of said middle layer material having the first color on the article until the first middle layer material with the first color is coated solidly onto the flower pot base;
   (d) immediately proceeding to next step without allowing the first middle layer material to dry;
   (e) spraying or brushing a second middle layer material having a second color onto the flower pot base, wherein the second color is different from the first color;
   (f) repeating step (e) based on a configuration of the flower pot base and an effect of said second middle layer material having the second color on the article until the second middle layer material with the second color is coated solidly onto the flower pot base;
   (g) allowing all the first and the second middle layer materials to dry; and
   (h) spraying a surface layer material which is a PU imitation porcelain material onto the article and allowing the article to dry, thereby an imitation ceramic effect is provided to the flower pot base through coating with the primer layer material, the first and the second middle layer material and the surface layer material respectively.

6. The method of application of a paint coating material onto the flower pot object, as recited in claim 5, wherein the primer layer material is diluted by a primer layer diluting agent to facilitate an application of the primer layer material, wherein a weight ratio of the primer layer material and the primer layer diluting agent is 1:0.5-1 and the primer layer diluting agent is a thinner composition of the primer layer; wherein each of the first and the second middle layer material is diluted by a middle layer diluting agent for the particular middle layer material to facilitate an application of the particular middle layer material, wherein a weight ratio of the particular middle layer material and the middle layer diluting agent is 1:0.5-1 and the middle layer diluting agent is pure water for the water-based imitation porcelain coating material of the middle layer; and the surface layer material is mixed with a curing agent and a diluting agent for the surface layer material to facilitate an application of the surface layer, wherein a weight ratio of the surface layer material, the curing agent and the diluting agent of the surface layer material is 1:0.3-1:0.5-1 and the diluting agent is a thinner composition for the surface layer, wherein the thinner composition for the primer layer material consists essentially of: 3-10% butyl acetate; 50-60% xylene; 5-15% propylene glycol monomethyl ether acetate and 5-15% isophorone by weight, wherein the middle layer diluting agent is 100% pure water for the water-based imitation porcelain coating material of the middle layer, wherein the primer layer pigment composition is a colored paste or a colored substance in small powder form, wherein the colored substance in small powder form of the primer layer pigment composition is titanium dioxide rutile, wherein the middle layer pigment composition is a colored paste or a colored substance in small powder form, wherein the colored substance in small powder form of the middle layer is titanium dioxide rutile, wherein the anti-settling agent is activated polyamide wax.

\* \* \* \* \*